US011958232B2

(12) United States Patent
Christiansen et al.

(10) Patent No.: US 11,958,232 B2
(45) Date of Patent: Apr. 16, 2024

(54) APPARATUS FOR FORMING PLASTIC MATERIAL PREFORMS INTO PLASTIC MATERIAL CONTAINERS WITH DECOUPLED DRIVES

(71) Applicant: KRONES AG, Neutraubling (DE)

(72) Inventors: Peter Christiansen, Hamburg (DE); Markus Haller, Zeitlarn (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 17/054,122

(22) PCT Filed: May 9, 2019

(86) PCT No.: PCT/EP2019/061907
§ 371 (c)(1),
(2) Date: Nov. 9, 2020

(87) PCT Pub. No.: WO2019/215277
PCT Pub. Date: Nov. 14, 2019

(65) Prior Publication Data
US 2021/0114282 A1    Apr. 22, 2021

(30) Foreign Application Priority Data
May 9, 2018 (DE) ...................... 10 2018 111 235.1

(51) Int. Cl.
*B29C 49/42* (2006.01)
*B29C 49/36* (2006.01)
(Continued)

(52) U.S. Cl.
CPC .......... *B29C 49/4205* (2013.01); *B29C 49/36* (2013.01); *B29C 49/4236* (2013.01); *B29C 49/6409* (2013.01); *B29C 49/78* (2013.01)

(58) Field of Classification Search
CPC . B29C 49/4236; B29C 49/6409; B29C 49/78; B29C 49/4205; B29C 49/36;
(Continued)

(56) References Cited

U.S. PATENT DOCUMENTS

| 5,035,600 A * | 7/1991 | Voss ........................ B29C 49/28 425/161 |
| 5,326,258 A | 7/1994 | Gittner et al. ..................... 432/5 |

(Continued)

FOREIGN PATENT DOCUMENTS

| CN | 102774643 | 11/2012 | ............. B65G 47/74 |
| CN | 104552893 | 4/2015 | ............. B29C 49/42 |

(Continued)

OTHER PUBLICATIONS

International Search Report and Written Opiniun issued in PCT/EP2019/061907, dated Jul. 17, 2019, with English translation, 14 pages.

(Continued)

*Primary Examiner* — Monica A Huson
(74) *Attorney, Agent, or Firm* — HAYES SOLOWAY P.C.

(57) ABSTRACT

An apparatus for forming plastic material preforms into plastic material containers has a transport device which transports the plastic material preforms along a predetermined transport path, wherein this transport device has a plurality of transport devices preferably adjoining one another for transporting the plastic material preforms, with a heating device, which heats the plastic material preforms, and with a forming device which is arranged along the transport path of the plastic material preforms downstream of the heating device, wherein the apparatus has a first transport device which feeds the plastic material preforms individually to the heating device, wherein the heating device has a second transport device which transports the (Continued)

plastic material preforms during their heating. The first transport device has a first drive device and the second transport device has a second drive device and the first drive device and the second drive device can be controlled independently of one another.

11 Claims, 1 Drawing Sheet

(51) Int. Cl.
*B29C 49/64* (2006.01)
*B29C 49/78* (2006.01)

(58) Field of Classification Search
CPC ........... B29C 2949/78571; B29C 49/06; B29L 2031/7158
See application file for complete search history.

(56) References Cited

U.S. PATENT DOCUMENTS

| | | | | |
|---|---|---|---|---|
| 6,264,457 | B1 * | 7/2001 | Ohmes | B29C 49/78 425/534 |
| 6,386,857 | B1 | 5/2002 | Nava | 425/526 |
| 8,807,330 | B2 | 8/2014 | Kraus | B65G 37/00 |
| 10,434,699 | B2 | 10/2019 | Schoenberger | B29C 49/42 |
| 2011/0291332 | A1 | 12/2011 | Voth et al. | 264/532 |
| 2012/0080827 | A1 | 4/2012 | Senn et al. | B29C 49/12 |
| 2012/0261865 | A1 | 10/2012 | Neubauer et al. | B29C 49/56 |
| 2013/0061557 | A1 | 3/2013 | Kitano et al. | 53/167 |
| 2015/0111162 | A1 | 4/2015 | Huettner et al. | F27D 3/06 |
| 2016/0339622 | A1 | 11/2016 | Schoenberger | B29C 49/42 |
| 2016/0368197 | A1 | 12/2016 | Takahashi et al. | B29C 49/68 |
| 2017/0028610 | A1 | 2/2017 | Gerhards et al. | B29C 49/4236 |
| 2019/0091918 | A1 | 3/2019 | Klatt et al. | B29C 49/64 |

FOREIGN PATENT DOCUMENTS

| | | | |
|---|---|---|---|
| CN | 106166832 | 11/2016 | ............. B29C 49/64 |
| DE | 19906366 | 8/2000 | ............. B29C 49/42 |
| DE | 60019715 | 4/2006 | ............. B29C 49/42 |
| DE | 102012102357 | 9/2013 | ............. B29C 49/80 |
| DE | 102012107961 | 5/2014 | ............. B29C 49/68 |
| DE | 10 2015 107 814 | 12/2016 | ............. B29C 49/42 |
| EP | 1112835 | 7/2001 | ............. B29C 49/42 |
| WO | WO 0189790 | 11/2001 | ............. B29C 31/08 |
| WO | 2015185753 | 12/2015 | ............. B29C 49/12 |
| WO | 2016092046 | 6/2016 | ............. B29C 49/64 |
| WO | 2017178102 | 10/2017 | ............. B29C 49/12 |

OTHER PUBLICATIONS

International Preliminary Report on Patentability issued in PCT/EP2019/061907, dated Nov. 10, 2020, 6 pages.
German Search Report issued in German Patent Appln. Serial No. 10 2018 111 235.1, dated Sep. 29, 2021, with machine English translation, 11 pages.
Chinese Official Action issued in Chinese Patent Appln. Serial No. 201980030577.8, dated Nov. 15, 2021, with machine English translation, 12 pages.
European Search Report issued in corresponding European Patent Application serial No. 22175256.1, dated Aug. 10, 2022 with translation (12 pages).
Notice of Opposition filed in European Appln. No. 19723390.1, dated Apr. 17, 2023, 16 pages.

* cited by examiner

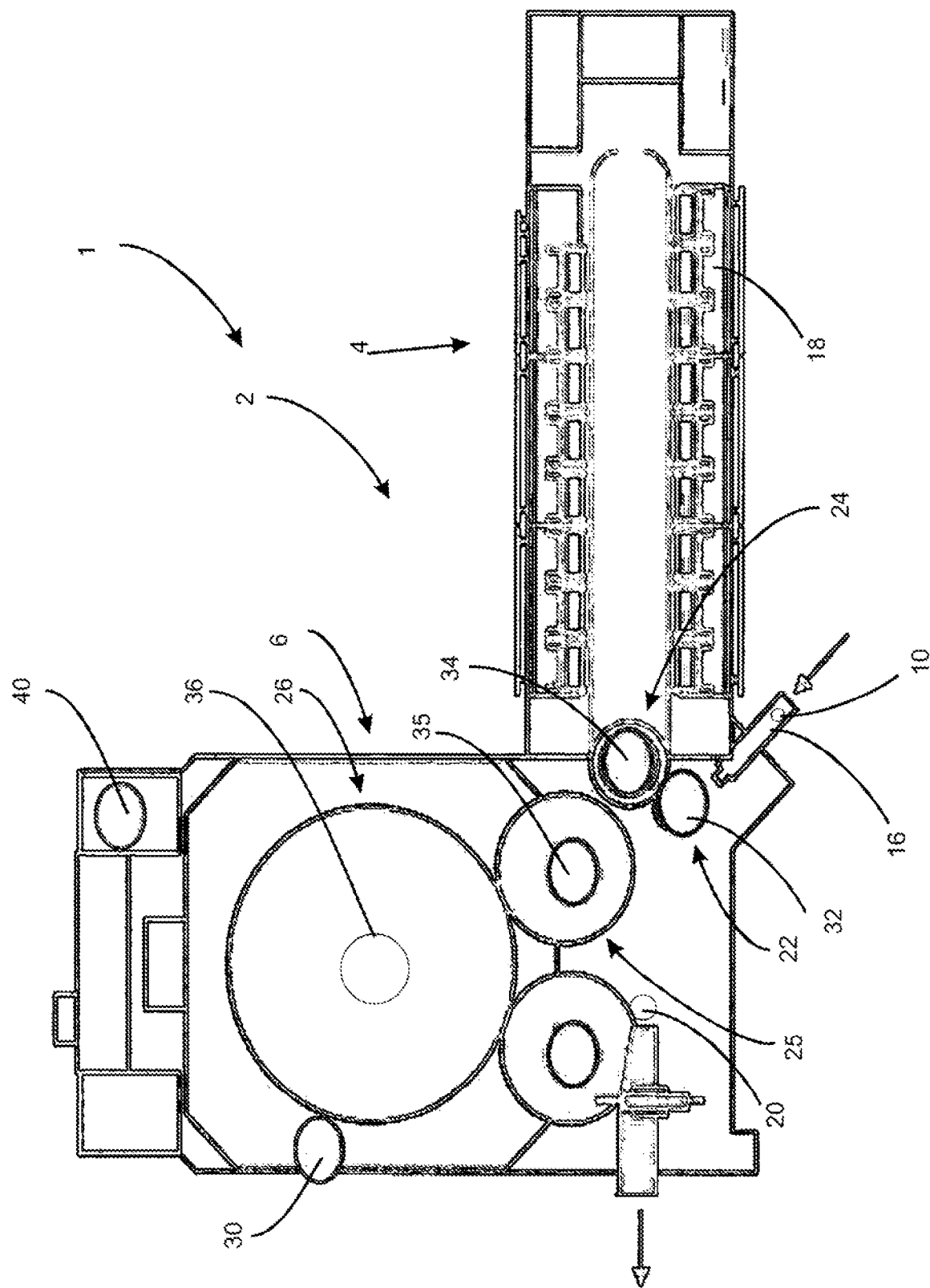

APPARATUS FOR FORMING PLASTIC MATERIAL PREFORMS INTO PLASTIC MATERIAL CONTAINERS WITH DECOUPLED DRIVES

BACKGROUND OF THE INVENTION

The present invention relates to an apparatus and a method for forming plastic material preforms into plastic material containers. Such apparatus and methods have long been known from the prior art. Usually, plastic material preforms are first heated in a heating device, especially but not exclusively an infrared oven, and then formed into plastic material containers in a forming device, especially a blow moulding device.

For this purpose, plastic material preforms are usually first transported in a row starting from a loose bulk and then the plastic material preforms are fed individually to the heating device or oven. To control the inflow of the plastic material preforms in a feeder to the heating device, a pneumatically movable locking bolt (a so-called preform barrier) is used in the prior art.

In order to prevent wedging of the plastic material preforms between a feed rail and an infeed saw tooth star in the case of an unsynchronised transfer of the plastic material preforms, a part of the feed rail is installed at this point so that it is movable perpendicular to the material flow direction.

This moving part is moved by a pneumatic cylinder in a production position. If wedging occurs, the moving part is moved against the force of a pneumatic cylinder from a production position. This change of position is detected in particular by sensors and the moving part is then moved by a machine control system to another end position to release the wedging.

Since high demands are placed on the travel dynamics of the preform barrier and the moving part of the feed rail, various components such as pneumatic cylinder valves and digital output modules are required for this, which also have corresponding properties. This is associated in overall with correspondingly high costs. Furthermore, the parameterisation of the preform barrier for a reliable synchronous transfer of the plastic material preforms to a saw tooth infeed star wheel is only possible to a limited extent. The parameters are also dependent on the production speed and the plastic material preforms.

The present invention is therefore based on the object of making such apparatus more flexible, especially in the event of failures.

SUMMARY OF THE INVENTION

An apparatus according to the invention for forming plastic material preforms into plastic material containers comprises a transport device which transports the plastic material preforms along a predetermined transport path, wherein this transport device comprises a plurality of to preferably adjoining transport devices for transporting the plastic material preforms.

Furthermore, the apparatus comprises a forming device which is arranged along the transport path of the plastic material preforms downstream of the heating device, wherein the apparatus comprises a first transport device which feeds the plastic material preforms individually to the heating device and wherein the heating device comprises a second transport device which transports the plastic material preforms during their heating.

According to the invention, the first transport device has a first drive device and the second transport device has a second drive device and the first and second drive devices are independently controllable.

It is therefore proposed in the context of the invention that the drive devices of the feeding device, such as a saw tooth star wheel, and the drive device of the actual furnace are independently controllable. Thus, it is possible, for example, that an infeed saw tooth star wheel is moved with its own servo drive or drive device.

In the applicant's internal prior art, it is known that a traversing movement is carried out in such a way that positioning is always synchronous with the heating chain. This means that the feeding devices and the heating device are always synchronised with each other.

In contrast, the invention suggests that independent drives are provided and that these are preferably decoupled from each other temporarily. Thus, within the scope of the invention, it is possible to move the drive, in particular the drive of the feeding device, i.e. for example the saw tooth star wheel, only when a transfer of the plastic material preforms has to take place.

In this way, the preform barrier described above can be omitted. Since the flow of the plastic material preforms is no longer interrupted, the moving part of the feed rail can also be made rigid.

The components previously required to control them can also be dispensed with.

In this way, material costs can be reduced. In addition, more reliable operation is also possible (the machine efficiency is increased). Parameterisation is also no longer necessary, so that a reduction in personnel costs is also possible. In a further advantageous embodiment, to the second transport device has a circulating transport means. This can be a rotating carrier, for example, but the circulating transport means preferably is a transport chain. A plurality of holding elements can be arranged on this transport chain, which are suitable and intended for transporting the plastic material preforms. Especially preferred this can be holding mandrels which engage in the mouths of the plastic material preforms.

Preferably, the heating device also has turning devices, which serve to turn the plastic material preforms around their longitudinal direction during heating. In addition, devices may also be provided which enable the holding elements to be moved perpendicular to the transport direction and in particular in a longitudinal direction of the plastic material preforms.

The transport path of the second transport device has particularly preferred sections with different curvatures. The transport path can have straight sections and between these straight sections, for example, curved sections in which a direction of movement of the plastic material preforms is deflected by a predetermined angle, about 180°.

In a further advantageous embodiment, the drive devices have motors, especially electric motors and in particular servo motors.

In a further advantageous embodiment the forming device is a blow moulding machine which transforms the plastic material preforms into plastic material containers by acting upon a gaseous medium. However, a forming device can also be provided which expands or forms the plastic material preforms with a liquid product and in particular with a medium to be filled.

In a further advantageous embodiment the fourth transport device, which is assigned to the forming device, is a so-called blowing wheel. Advantageously, at least one forming station and particularly preferably a plurality of forming stations is arranged on this blowing wheel. These forming stations in each case have, particularly preferably, blow-moulding devices, wherein these blow-moulding devices having, particularly preferably, side parts which can be pivoted relative to one another in order to receive plastic material preforms and expand them in their interior towards the plastic material containers and in particular plastic material bottles. In addition, the blow moulding devices preferably also have base parts which limit the cavity for receiving the plastic material preforms.

In a further advantageous embodiment, the forming stations also have bar-like bodies, in particular so-called stretching bars, which can be inserted into the interior of the plastic material preforms in order to stretch them in their longitudinal direction.

In a further advantageous embodiment, the apparatus has a control device which is suitable and intended to control the individual transport devices.

In a further advantageous embodiment, the apparatus has at least one sensor device which is suitable and intended to detect faults in the transport of the plastic material preforms. For example, wedging of plastic material preforms or similar can be detected. Preferably, in response to such an error of the first transport device, its drive can be slowed down or even switched off.

In a further advantageous embodiment, the first transport device is designed as a separating device, which separates successive plastic material preforms. This separating device particularly preferably has a saw-tooth star wheel, which particularly preferably has a plurality of recesses on the outer circumference, from which the plastic material preforms and in particular their necks can be picked up.

This saw-tooth star wheel is therefore preferably used to pick up individual plastic material preforms from an incoming stream of plastic material preforms and thus separate them.

In some cases, it is also necessary or advantageous to run particularly low production outputs with a forming device. This is conceivable, for example, if a forming device has few blow moulds or if the output range of a downstream filling machine is also small. In addition, it may also be desirable to set up a so-called laboratory machine operation (e.g. also for pilot mould sampling). In this case, the prior art provides special infeed sets for plastic material preforms, e.g. sets which are used for production on every second blowing station.

In addition, it is also known that a preform infeed blocking finger works in a clocked manner. In addition, a possibility known from the internal prior art of the applicant is that the plastic material preforms may simply be rejected in an unproduced state before a blowing process.

These prior art procedures are associated with disadvantages in the heating oven or the heating device of the blow-moulding machine. If only every second plastic material preform is fed into the machine, large gaps are created. These large gaps (larger gaps between the plastic material preforms in the oven) result in a much higher power consumption and this can also lead to higher thermal loads above the heating chamber (e.g. in the case of unoccupied heating mandrels).

The fact that, as mentioned above, particularly preferred several or all transport devices or their drives can be controlled independently of one another and that particularly preferably servo drive technology is provided in the forming device, achieves that (in particular for straight pitches) the output of all function wheels upstream of the blowing wheel can be adjusted with the aid of a selected operating screen program (which is particularly preferred to be selected in an operating screen of a blowing machine), that preforms are fed to the machine and in particular to the forming device without gaps. Preferably, all settings of the function wheels in relation to each other can be stored in the operating screen program as machine recipes or production recipes.

In this way, the output is reduced to the extent that only e.g. every second forming station or only one single forming station is fed with plastic material preforms.

This in turn offers the advantage that a very high degree of flexibility can be produced at the push of a button. Even if, for example, a user only wants to produce a small series (because he only has one blow mould, for example), he can do so for a long time without increased energy consumption. There is no thermal overloading of the areas above the heating channel and no special parts of fittings are required.

With a constantly clocked working infeed finger for plastic material preforms, there was also an increased susceptibility to faults and a significantly reduced service life.

In extreme cases, only a single machine or laboratory machine could be used. It would also be possible to use this invention on the well-known rotary machines as production machines.

In this way, the advantage of servo drive technology in particular can be better exploited.

In a further advantageous embodiment, the first transport device can be driven at a different and in particular slower transport speed with respect to the second transport device. It would also be possible, as mentioned above, to stop the first transport device temporarily while the second transport device, which transports the plastic preforms through the oven, continues to run.

In a further advantageous embodiment therefore the first transport device is stoppable when the second transport device is in continued operation. In this way, no more plastic material preforms reach the second transport device and in particular the oven. The first transport device can preferably be operated at a maximum speed at which it is synchronised to the second transport device.

Particularly preferred, the first transport device acts as a transport lock, particularly preferred no further preform lock as described above is necessary.

In a further advantageous embodiment, the apparatus has a feeding device which feeds the plastic material preforms to the first transport device, in particular as a product stream. Here, the plastic material preforms are particularly preferably transported in contact with each other and touch each other. The separating device separates this product stream as mentioned above. The apparatus particularly preferably comprises a sorting device which, for example, sorts and in particular aligns the plastic material preforms from a preform chute or a loose bulk.

In a further advantageous embodiment, the apparatus has feed rails which feed the plastic material preforms to the first transport device. These feed rails are particularly preferred are rigid and in an exact position in relation to the first transport device.

In a further advantageous embodiment, the heating device has at least one and preferably a plurality of heating devices arranged along the transport path of the plastic material preforms. These can be, for example, heating elements or heating boxes, which are arranged in particular laterally next to the transport path of the plastic material preforms. In particular, the heating devices are stationary heating devices.

Particularly preferably, the heating devices to are infrared heating devices. However, it is also possible that the heating device is a microwave oven.

In a further advantageous embodiment, the apparatus also has a cooling device, which is suitable and designed to cool the plastic material preforms.

Particularly preferably, the heating device has a channel through which the plastic material preforms are transported.

In a further advantageous embodiment, the transport device has a third transport device, which is suitable and intended to transport the plastic material preforms from the heating device to the forming device. This third transport device can be a transport star wheel, for example. It would even be possible that several transport devices are provided which convey the plastic material preforms from the heating device to the forming device. In a further advantageous embodiment, sterilisation elements or sterilisation units can also be provided between the heating device and the forming device to sterilise the plastic material preforms.

In a further advantageous embodiment, the third transport device has a drive device, and this drive device in particular can be controlled independently of the drive device of the second transport device and/or the drive device of the first transport device.

In a further preferred embodiment, all transport devices can be controlled independently of each other. In this way a particularly high degree of flexibility is achieved.

The present invention is further directed to a method for forming plastic material preforms into plastic material containers, wherein the plastic material preforms are transported with a transport device along a predetermined transport path and wherein this transport device comprises a plurality of transport devices (which preferably adjoin one another) for transporting the plastic material preforms.

Furthermore, a heating device is provided which heats the plastic material preforms, and a forming device which is arranged along the transport path of the plastic material preforms after the heating device and which forms the plastic material preforms into the plastic material containers by acting upon a flowable medium. Furthermore, the apparatus has a first transport device which feeds the plastic material preforms individually to the heating device, wherein the heating device has a second transport device which transports the plastic material preforms during their heating.

According to the invention, the first transport device has a first drive device and the second transport device has a second drive device and the first drive device and the second drive device are controlled independently of each other at least temporarily.

Further advantages and embodiments are shown in the attached drawing.

BRIEF DESCRIPTION OF THE DRAWINGS

In the drawings:

FIG. 1 is a schematic representation of an apparatus according to the invention for forming plastic material preforms into plastic material containers.

DETAILED DESCRIPTION OF THE INVENTION

FIG. 1 shows an apparatus 1 for forming plastic material preforms 10 into plastic material containers 20. This apparatus roughly has a heating device 4, which serves to heat the plastic material preforms. This heating device is followed by the actual forming device 6. This forming device has a rotatable carrier 36 on which a plurality of forming stations 30 (only one shown) are arranged.

The plastic material preforms 10 are first fed via feed rails 16 to a first transport device 22. This transport unit 22 has its own drive 32. This first transport device 22 is designed here as a transport star wheel or saw tooth star wheel, which also serves for separating the plastic material preforms.

Starting from this first transport device 22, the plastic material preforms 10 are transported to a second transport device 24, which guides the plastic material preforms through the heating device 4. This second conveyor 24 likewise has its own drive unit 34, which can be controlled independently of the drive unit 32.

The reference sign 18 indicates a heating device, which in this case is arranged laterally next to the transport path of the plastic material preforms.

The heating device 4 is followed by a third transport device 25 with a drive device 35. This can be, for example, a transport star wheel or a transport wheel, which transports the plastic material preforms to the forming unit 6.

The reference sign 26 thus indicates the fourth transport device which transports the forming stations 30 and thus also the plastic material preforms arranged in these forming stations. The reference mark 36 roughly indicates a drive for this transport device 26.

Therefore, all transport devices are preferably driven by servo motors.

The reference sign 40 indicates a control device for controlling the entire plant. However, individual control of the individual drives of the transport devices is preferably also provided.

The applicant reserves the right to claim all features disclosed in the application documents as being essentially inventive, provided that they are, individually or in combination, new compared to the prior art. It is further pointed out that the individual FIGURES also describe features which may be advantageous in themselves. The skilled person recognises immediately that a certain feature described in a FIGURE can be advantageous even without adopting further features from this FIGURE. Furthermore, the skilled person recognises that advantages may also result from a combination of several features shown in individual or different FIGURES.

LIST OF REFERENCE SIGNS 1 apparatus
4 heating device or warming device
6 forming device
10 plastic material preforms
16 feed rails
18 heating device
20 plastic material containers
22 transport device
24 second transport device
25 third transport device
26 fourth transport device
30 forming stations
32 drive
34 drive unit of the second transport device
35 drive unit of the third transport device
36 rotating carrier
36 drive of the fourth transport device
40 control device

The invention claimed is:

1. An apparatus for forming plastic material preforms into plastic material containers, said apparatus having a transport device configured to transport the plastic material preforms along a predetermined transport path, wherein this transport device comprises a plurality of transport devices for transporting the plastic material preforms, a heating device configured to heat the plastic material performs, and a forming device which is arranged along the transport path of the plastic material preforms after the heating device, wherein the apparatus comprises a first transport device configured to feed the plastic material preforms individually to the heating device, wherein the heating device comprises a second transport device configured to transport the plastic material preforms during their heating, wherein
the first transport device comprises a first drive device and the second transport device comprises a second drive device and, wherein the first drive device and the second drive device are controllable independently of each other,
wherein the first transport device is configured to be driven at a different transport speed with respect to the second transport device, and the first transport device is configured to be stopped while the second transport device is in continued operation,
wherein the first drive device of the first transport device is only moved when a transfer of the plastic material preforms has to take place, so that the first transport device acts as a transport lock, wherein
the transport device has a third transport device which is configured to transport the plastic material preforms from the heating device to the forming device, and the third transport device has a drive device and which is configured to be controllable independently of the drive device of the first transport device and/or the drive device of the second transport device,
wherein the forming device is a blow moulding machine which is configured to transform the plastic material preforms into plastic material containers by acting upon a gaseous medium,
wherein a fourth transport device, which is assigned to the forming device, is a blowing wheel and a plurality of forming stations is arranged on the blowing wheel,
wherein the forming stations have stretching bars, and
wherein the apparatus has a sorting device which is configured to sort and align the plastic material preforms from a preform chute, and at least one sensor device which is configured to detect faults in the transport of the plastic material preforms, wherein in response to such an error of the transport device, a transport drive can be slowed down or switched off.

2. The apparatus according to claim 1,
wherein
the first transport device is designed as a separating device which is configured to separate successive plastic performs.

3. The apparatus according to claim 2, wherein the apparatus has a feed device is configured to feed the plastic material preforms to the first transport device.

4. The apparatus according to claim 2, wherein the heating device comprises at least one heating device arranged along the transport path of the plastic material preforms.

5. The apparatus according to claim 2, wherein the transport device has a third transport device which is configured to transport the plastic material preforms from the heating device to the forming device.

6. The apparatus according to claim 5, wherein the third transport device has a drive device and this drive device is configured to he controllable independently of the drive device of the first transport device and/or the drive device of the second transport device.

7. The apparatus according to claim 2, wherein all transport devices are configured to controlled independently of one another.

8. The apparatus according to claim 1, wherein the apparatus has a feed device configured to feed the plastic material preforms to the first transport device.

9. The apparatus according to claim 1, wherein the heating device comprises at least one heating device arranged along the transport path of the plastic material preforms.

10. The apparatus according to claim 1, wherein all transport devices are configured to controlled independently of one another.

11. A method for forming plastic material preforms into plastic material containers, wherein the plastic material preforms are transported with a transport device along a predetermined transport path, wherein this transport device comprises a plurality of transport devices for transporting the plastic material preforms, wherein a heating device heats the plastic material preforms and a forming device which is arranged along the transport path of the plastic material preforms after the heating device forms the plastic material preforms into the plastic material containers by acting upon a flowable medium, wherein the apparatus has a first transport device which feeds the plastic material preforms individually to the heating device, Wherein the heating device has a second transport device which transports the plastic material preforms during their heating, wherein
the first transport device has a first drive device and the second transport device has a second drive device, said process comprising the step of controlling; the first drive device and the second drive device independently of each other at least at times,
wherein the first transport device is driven at a different transport speed with respect to the second transport device, and the first transport device is stopped while the second transport device is in continued operation,
wherein the first drive device of the first transport device is only moved when a transfer of the plastic material preforms has to take place, so that the first transport device acts as a transport lock, wherein
the transport device has a third transport device which is configured to transport the plastic material preforms from the heating device to the forming device, and the third transport device has a drive device which is configured to be controllable independently of the drive device of the first transport device and/or the drive device of the second transport device,
wherein the forming device is a blow moulding machine which is configured to transform the plastic material preforms into plastic material containers by acting upon a gaseous medium,
wherein the transport device has a fourth transport device which is a blowing which is assigned to the forming device, and a plurality of forming stations is arranged on the blowing wheel,
wherein the forming stations have stretching bars,
wherein the apparatus has a sorting device which is configured to sort and align the plastic material preforms from a preform chute, and at least one sensor device which is configured to detect faults in the transport of the plastic material preforms wherein in response to such an error of the transport device, a transport drive can be slowed down or switched off.

* * * * *